(12) United States Patent
Mellor et al.

(10) Patent No.: US 7,482,787 B2
(45) Date of Patent: Jan. 27, 2009

(54) CONTROLLER FOR A PERMANENT MAGNET GENERATOR AND A GENERATOR IN COMBINATION WITH SUCH A CONTROLLER

(75) Inventors: Philip Henry Mellor, Bristol (GB); Stephen George Burrow, Beercrocombe (GB); Philip Michael Churn, Aberdeen (GB)

(73) Assignee: Goodrich Control Systems Limited, Solihull (GB)

( * ) Notice: Subject to any disclaimer, the term of this patent is extended or adjusted under 35 U.S.C. 154(b) by 75 days.

(21) Appl. No.: 11/746,187

(22) Filed: May 9, 2007

(65) Prior Publication Data
US 2007/0210767 A1 Sep. 13, 2007

(30) Foreign Application Priority Data
May 17, 2005 (GB) ................... 0510066.4

(51) Int. Cl.
*H20P 9/14* (2006.01)
(52) U.S. Cl. .............................. 322/46; 322/28; 322/38; 322/13

(58) Field of Classification Search ................. 322/46, 322/28, 38, 13
See application file for complete search history.

(56) References Cited

U.S. PATENT DOCUMENTS

| 5,177,677 | A | 1/1993 | Nakata et al. | |
|---|---|---|---|---|
| 6,239,581 | B1 | 5/2001 | Yoshida | |
| 7,304,400 | B2 * | 12/2007 | Kang et al. | 290/44 |
| 7,307,404 | B2 * | 12/2007 | Mellor et al. | 322/46 |
| 7,378,808 | B2 * | 5/2008 | Kuras et al. | 307/10.1 |

* cited by examiner

*Primary Examiner*—Nicholas Ponomarenko
*Assistant Examiner*—Iraj A Mohandesi
(74) *Attorney, Agent, or Firm*—Reising, Ethington, Barnes, KIsselle, P.C.

(57) ABSTRACT

A generator controller for controlling a permanent magnet generator where each phase of the generator is connectable to a DC link via electrically controllable switches, the controller characterized by a data processor adapted to receive a measurement of generator current output and a demand current, and to form a current error between the demanded value and the measured generator current; derive a target voltage as a function of the current error; and form control signals for the electrically controllable switches as a function of the target voltage.

13 Claims, 7 Drawing Sheets

CONTROLLER FOR A PERMANENT MAGNET GENERATOR AND A GENERATOR IN COMBINATION WITH SUCH A CONTROLLER

FIELD OF THE INVENTION

The present invention relates to a controller for a permanent magnet generator, and to such a controller in combination with a permanent magnet generator.

BACKGROUND TO THE INVENTION

Figure 1:
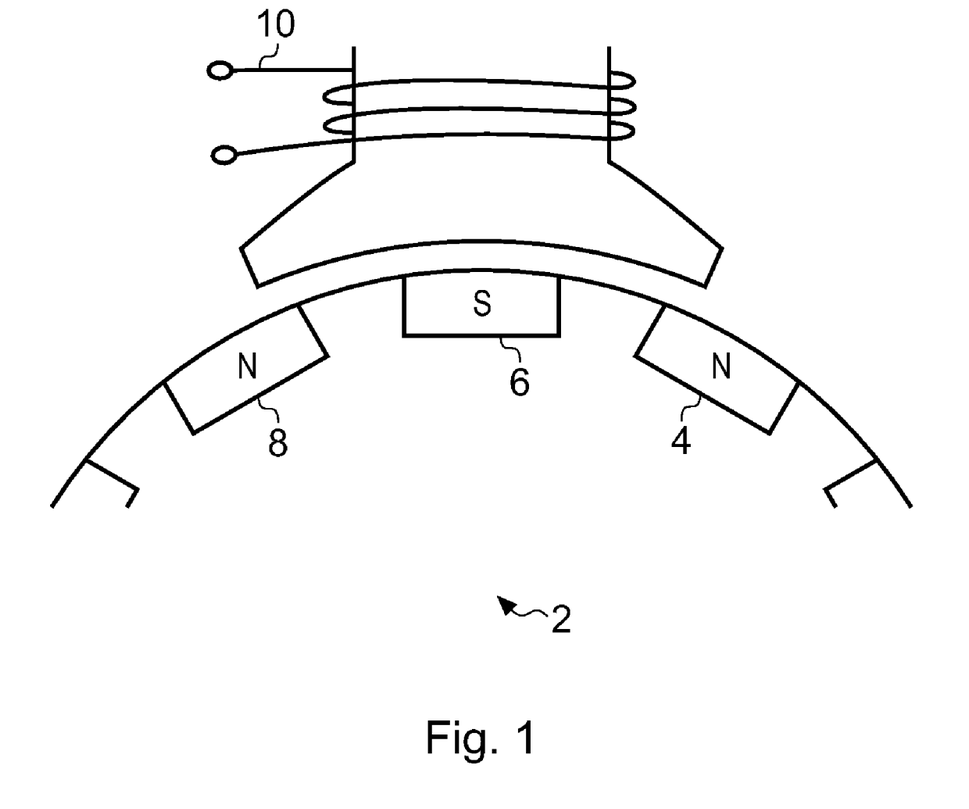
FIG. 1 schematically illustrates part of the rotor and stator of a permanent magnet generator.

Permanent magnet generators represent a simple and reliable form of generator construction that is suitable for use in situations where high reliability is paramount. In essence, and as schematically illustrated in FIG. 1, a rotor 2 carries a plurality of permanent magnets 4, 6 and 8 regularly disposed around its circumference. Rotation of the rotor causes the magnets to be moved towards and then away from the stator coils 10, of which only one is shown, held by the stator of the generator.

The voltage generated in each stator coil is $$V = -N\frac{d\Phi}{dt}$$

where
Φ is the instantaneous value of the magnetic flux cutting the stator coil.
N is the number of turns of the stator coil.

This shows that, at least while no current is being drawn, the generator output voltage is proportional to the rotor speed.

When a current is drawn the situation becomes a little more complicated because:
i. the coils have a finite resistance and consequently part of the voltage is dropped across the resistance of the coil.
ii. current flow within the coil causes it to produce its own magnetic field, which then interacts with the field from the permanent magnets causing the voltage to change.

Furthermore it is known that when uncontrolled, the generator output voltage can vary over a wide range dependent upon generator speed and load.

It is inconvenient for the voltage supplied to a load to vary over a wide range and therefore some form of stabilisation is useful.

It is known to convert the generator output to a DC voltage using a power converter. A controller can be used to control the power converter so as to provide a desired output voltage at a DC link.

Generally, in order to perform stable control of the generator, it has been necessary to include a position detector on the rotor. Sensing the rotor position allows the voltage waveform under no load conditions to be inferred from a knowledge of the generator design and sensor position. This can be compared with the current waveform to obtain a measurement of current angle. Such a system is described in U.S. Pat. No. 6,583,995.

U.S. Pat. No. 5,177,677 includes means (not described in detail) for measuring the "source voltage" of a generator, as described at column 6 lines 1 to 3. This measurement of source voltage is probably made with an additional sense coil wound onto the stator such that an output voltage under no-load conditions can be inferred. The circuit also measures the current waveforms and consequently the phase shift between the voltage and the current can be directly derived to give the power factor.

U.S. Pat. No. 6,239,581 discloses a regulation circuit which monitors the voltage occurring across a load and on the basis of this measurement may pass current through an inductor connected in parallel with the generator so as to add a "lag" into the power factor.

SUMMARY OF THE INVENTION

According to a first aspect of the present invention there is provided a method of controlling a permanent magnet generator where each phase of the generator is connectable to a DC link via electrically controllable switches, the method comprising the steps of:
i. receiving a measurement of the current output of the generator;
ii. receiving a demand current indicative of the current that the generator is required to supply;
   iii. forming a current error between the demanded current and the measured current, and using this to derive a target voltage; and
iv. controlling the electrically controllable switches as a function of the target voltage.

In a preferred implementation of the invention there is provided a method of controlling a permanent magnet generator where each phase of the generator is connectable to a DC link via electrically controllable switches, the method comprising the steps of:
i. receiving a measurement of the current output of the generator;
ii. receiving a demand current indicative of the current that the generator is required to supply;
iii. forming a current error between the demanded current and the measured current, and using this to derive a target voltage;
iv. forming a target voltage phase angle relative to a frame of reference as a function of a demanded power factor angle and an inferred current phase shift relative to the frame of the reference, and
v. controlling the electrically controllable switches as a function of the target voltage and the target voltage phase angle.

The additional step of forming the target voltage phase reference and then controlling the electronically controllable switches as a function of both the target voltage and the target voltage phase angle gives the control system the ability to cope with significant generator speed variation.

According to a second aspect of the present invention there is provided a generator controller adapted to:
1) receive a measurement of generator current output and a demand current value, and to form a current error between the demand current value and the measured generator current;
2) derive a target voltage as a function of the current error;
3) form a target voltage phase angle as a function of a demanded power factor angle and a calculated current phase shift relative to a frame of reference; and
4) form control signals for electrically controllable switches within a switching converter as a function of the target voltage and the target voltage phase angle.

It is thus possible to provide a generator controller that only needs to measure the phase currents supplied by the generator. No measurements of rotor position or generator output voltage under load or no-load conditions are required.

Preferably the generator is a three phase generator. Under such circumstances the currents in the phases can conveniently be designated $I_a$, $I_b$ and $I_c$.

Advantageously the three phase current measurements are converted into an equivalent current vector Ī having a magnitude Im and a phase θi with respect to an arbitrary frame of reference. This arbitrary frame of reference acts as a common reference frame for both the current vector and, as will be considered later, a voltage vector.

Advantageously a Clark's transform is used to convert the measured current $I_a$, $I_b$ and $I_c$ from a phase-time based measurement to an equivalent space, generally designated (α, β, 0) as it is known to the person skilled in the art. A Cartesian to polar transform may then be used to convert α and β to magnitude and phase values.

Advantageously the target voltage, Vm, represents a voltage magnitude, and similarly the target voltage angle θv represents a phase angle with respect to the arbitrary (but common) frame of reference. Preferably a polar to Cartesian transform is applied to $V_m$ and $\theta_v$, followed by an inverse Clark's transform so as to derive a set of target voltages $V_a$, $V_b$ and $V_c$ for each of the phases. These voltages $V_a$, $V_b$ and $V_c$ can then be regenerated by driving pairs of electrically controllable switches connected in series between the voltage rails of the DC link voltage in order to produce pulse width modulated versions of those voltages at the node between the pairs of switches.

Preferably the target voltage $V_m$ is proportional to or is partially proportional to the output current less the demanded current I*. This is counter intuitive as normally feedback loops respond proportionately to the demanded value minus the measured value, whereas this feedback loop responds proportionately to the measured value minus the demanded value. In this discussion it is assured that the constant of proportionality is a positive value.

In an embodiment of the invention the current error is used to derive a compensating phase angle. This may, for example, be computed in the analog or digital domains or looked up from a look-up table. In an alternative embodiment the demand current may be used to derive a compensating phase angle. The target voltage phase angle $\theta_v$ may then be modified by the desired power factor angle φ* and the current phase angle $\theta_i$ and this compensating phase angle.

According to a third aspect of the present invention there is provided a computer program for causing a programmable data processor to implement the method according to the first aspect of the present invention.

According to a fourth aspect of the present invention there is provided a power generation system comprising a permanent magnet generator and a generator controller in accordance with the second aspect of the present invention.

DESCRIPTION OF PREFERRED EMBODIMENTS OF THE PRESENT INVENTION

Figure 2:
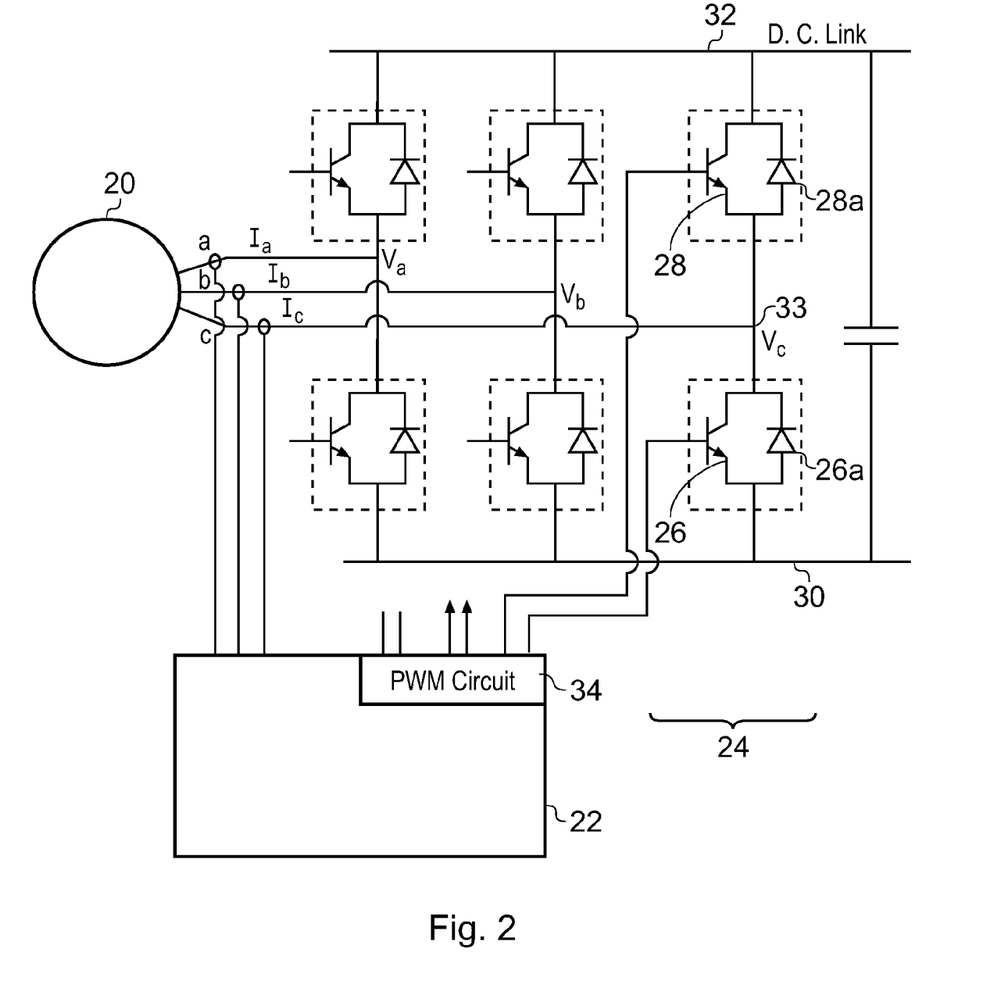
FIG. 2 schematically illustrates a generator, a power converter, and a controller where the controller constitutes an embodiment of the present invention.

FIG. 2 schematically illustrates an embodiment of the present invention and shows it in conjunction with a three phase generator and switching power converter. The three phase permanent magnet generator 20 has three outputs, A, B and C each of which has a current waveform represented by $I_a$, $I_b$ and $I_c$ and a voltage output waveform represented by the $V_a$, $V_b$ and $V_c$. The current waveforms $I_a$, $I_b$ and $I_c$ are measured by suitable transducers, such as current transformers, hall effect devices or the inclusion of resistive elements within the current path such that the voltage dropped across the resistive element is proportional to the current flowing therethrough. The measurements of current $I_a$, $I_b$ and $I_c$ are supplied to a controller, generally designated 22. No other measurements are required from the generator. Thus, in contrast with prior art systems a position sensor is not used to determine the position of the rotor and neither is a sense coil used in order to determine or deduce the induced voltage under no-load conditions. Each of the individual phases from the generator is supplied to a respective switching circuit within a power converter, generally designated 24. Each of the switching circuits are identical and therefore, for brevity, only the switching circuit associated with phase C will be described in detail. The switching circuit comprises two electronic switches 26 and 28 arranged in series between negative and positive DC voltage rails 30 and 32, respectively. The respective output of the generator is connected to a node 33 formed between the switches 26 and 28. In this example the switches have been drawn as being bi-polar transistors although other semiconductor switches may be used, such as thyristors, IGBTs or field effect transistors. Commutation diodes 26a and 28a are connected in a parallel with the switches 26 and 28, respectively. A control terminal of each switch 26 and 28 is connected to a respective drive output from a pulse width modulation circuit 34 within the controller 22. The pulse width modulation circuit 34 controls the switches 26 and 28 so as to synthesise a voltage sinusoid at the node 33 in response to signals from the controller 22. The pulse width modulation circuit 34 and the power converter 24 are known from the prior art and are described merely to set the present invention in context.

Figure 3:
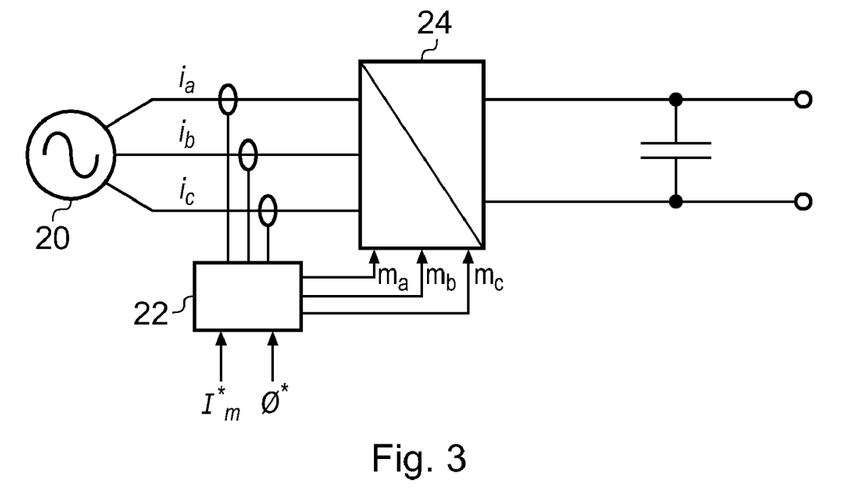
FIG. 3 represents the circuit shown in FIG. 2 in simplified diagrammatic form.

FIG. 3 schematically shows the arrangement of FIG. 2 more simply. The controller accepts the current measurements $I_a$, $I_b$ and $I_c$, and also a demand current magnitude $I^*_m$ and a demand current phase angle φ*. From this the controller outputs three modulating signals $M_a$, $M_b$ and $M_c$ that represent the target voltage sinusoids $V_a$, $V_b$ and $V_c$ which are regenerated by the pulse width modulation circuit 34 of FIG. 2.

Figure 4:
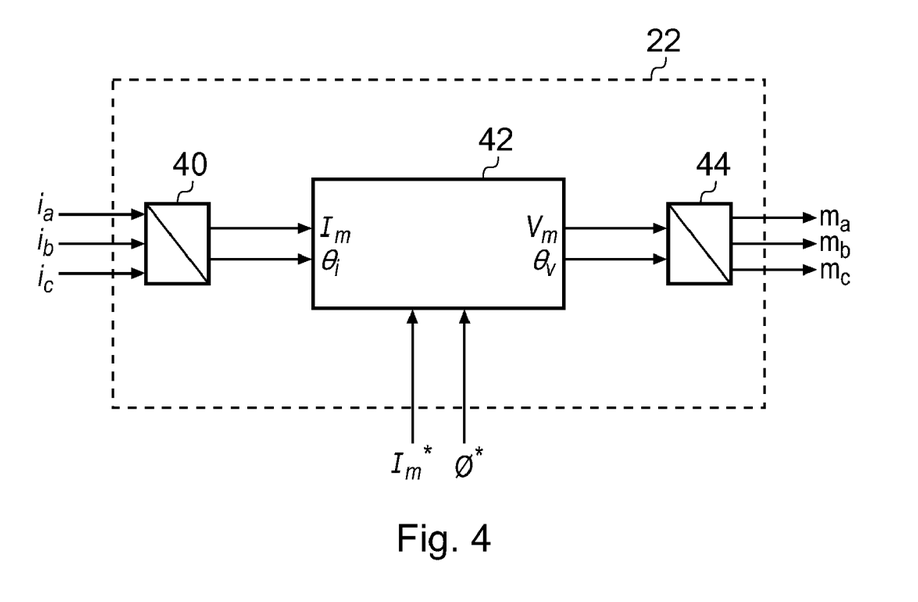
FIG. 4 schematically shows the functional elements within the controller.

FIG. 4 schematically shows the internal details of the controller 22. The controller 22 in broad terms comprises three elements. These are a current transformation block (or device) 40, a processing section 42 for receiving the measured current magnitude and phase angle, target current magnitude and phase angle, and outputting a target voltage magnitude and phase angle; and an output converter 44 for receiving the target output voltage magnitude and output voltage phase angle and converting these into voltage waveforms for each of the three phases of the generator.

The current transformation block 40 receives the instantaneous measurements of the currents $I_a$, $I_b$ and $I_c$ and then seeks to convert these three current measurements into a parameterised version of current magnitude and angle with respect to an arbitrary reference vector. This is achieved firstly by performing a Clark's transform to convert the three measurements from phase space (a, b, c) to an equivalent space termed ($\alpha$, $\beta$, 0) using its Clark's transform given by:

$$T_{\alpha\beta 0} = \begin{bmatrix} 1 & -\frac{1}{2} & -\frac{1}{2} \\ 0 & \sqrt{\frac{3}{2}} & -\sqrt{\frac{3}{2}} \\ \frac{1}{2} & \frac{1}{2} & \frac{1}{2} \end{bmatrix} \quad \text{Equation 1}$$

such that $$\begin{bmatrix} i_a \\ i_b \\ i_0 \end{bmatrix} = T_{\alpha\beta 0} \begin{bmatrix} i_a \\ i_b \\ i_c \end{bmatrix} \quad \text{Equation 2}$$

After having converted the currents into this transformed space, a Cartesian to polar co-ordinate transformation is used to convert $\alpha$ and $\beta$ to magnitude and phase information using the following equations:

$$I_m = |i_\alpha + ji_\beta| = \sqrt{i_\alpha^2 + i_\beta^2} \quad \text{Equation 3}$$

$$\theta_i = \tan^{-1}\left(\frac{i_\beta}{i_\alpha}\right) \quad \text{Equation 4}$$

Other transforms are known to the person skilled in the art, but the Clark's transform is generally accepted as being an appropriate transform for this task. The values $I_m$ and $\theta_i$; provide a phasor representation of the current vector to an arbitrary frame of reference. These values $I_m$ and $\theta_i$ are then provided to the data processing unit 42. This section implements a control algorithm either within hardware or software and uses the measured current vector and a demand current magnitude and demand power factor angle (i.e. the angle between the voltage and current vectors) to produce a desired voltage vector defined by a voltage magnitude $V_m$ and its phase angle $\theta_v$ relative to the arbitrary frame of reference. Once values $V_m$ and $\theta_v$ have been calculated, they are passed to transform block 44 which effectively mirrors the operations of block 40 in that it first performs a polar to Cartesian co-ordinate transformation, using equations 3 and 4, to obtain $V_\alpha$ and $V_\beta$, and then it performs an inverse Clark's transform to obtain target phase voltages $V_a$, $V_b$ and $V_c$, each one representing one of the inverter phases within the power converter 24.

Figure 5:
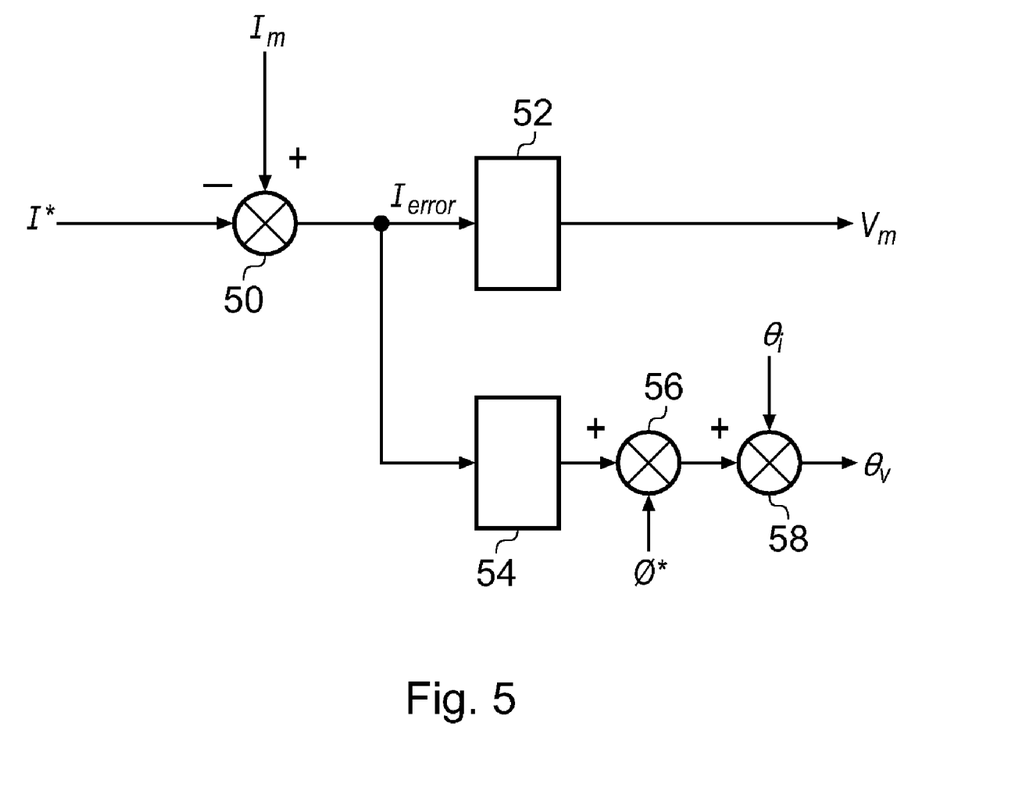
FIG. 5 is a schematic diagram of the functional blocks implementing the control strategy within the controller.

FIG. 5 shows the processing performed within the block 42 in greater detail.

A summing element 50 receives the representation $I_m$ of the current supplied by the generator at its non-inverting input, and subtracts the demand current I* from the supplied current in order to output a current error $I_{error}$. The current error value is supplied as an input to a proportional block 52 which multiplies the value $I_{error}$ by a constant and outputs a target voltage magnitude $V_m$. The current error, $I_{error}$, is also provided as an input to a control block 54 which converts the current error into a compensating phase angle. The phase angle is constrained to lie in the range 0 to 360°, and generally, within a generator, the current is out of phase with the voltage over the range of approximately 90° to 270°. The controller 54 may, for example, be implemented as a look up table or, in a digital system, it may be presented as an algorithm. The output of the controller 54 is supplied to a summer 56 where the demanded power factor angle is added to it. The output of the summer 56 is supplied to a further summer 58 where the current phase angle is added. The output of the summer 58 is the voltage phase angle $\theta_v$. Although the operation of the controller has been described in terms of hardware processing blocks, all of its functionality can be performed within a suitably programmed data processor.

The controller 54 effectively produces the current error to produce a shift in the power factor angle when saturation of the voltage magnitude occurs due to the finite DC link voltage. This ensures the current controller retains control of the current during over modulation, i.e. when the circuit operation is limited by the DC link voltage.

It is worthwhile considering operation of the controller. For simplicity, assume that the controller and generator is in steady state and that the current error $I_{error}$ is positive and that the controller 52 comprises only a proportional control term such that $V_m = K \times I_{error}$. From this it follows that voltage magnitude $V_m$ is a finite positive value.

As regards the calculation of the voltage angle $\theta_v$, the angle of the current vector $\theta_i$ has already been obtained from the conversion unit 40 and this angle is rotating at the same frequency as the generator EMF. Therefore it remains fixed in the frame of reference. The controller 40 adds the desired power factor angle $\phi^*$ to the angle of the current vector $\theta_i$ to produce the angle $\theta_v$. Thus the controller 42 produces a voltage vector with magnitude and phase information. The voltage vector is used to control the power converter switches via the pulse width modulation circuit and in so doing forces the generator to produce the current necessary to keep the system in a steady state condition.

A further power controller, not shown, has knowledge of the nominal supply voltage and the power drawn by each load, and can use this in order to calculate the demand current and the desired power factor angle. It then supplies the new demand current and power factor angle to the generator controller. Suppose, that a new load is added to the output of a generator such that the demanded current will increase. This causes the current error $I_{error}$ to reduce due to the action of the summation block 50. This in turn causes the magnitude of the voltage vector $V_m$ to reduce which results in a reduction in the magnitude of the phase voltages $V_a$, $V_b$, $V_c$. The power factor angle however remains the same.

Figure 6:
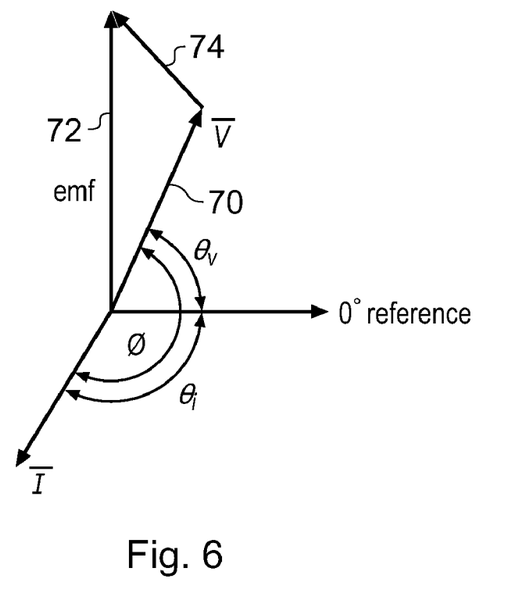
FIG. 6 is a phasor diagram showing the voltage and current vectors with respect to the arbitrary frame of reference.
Figure 7:
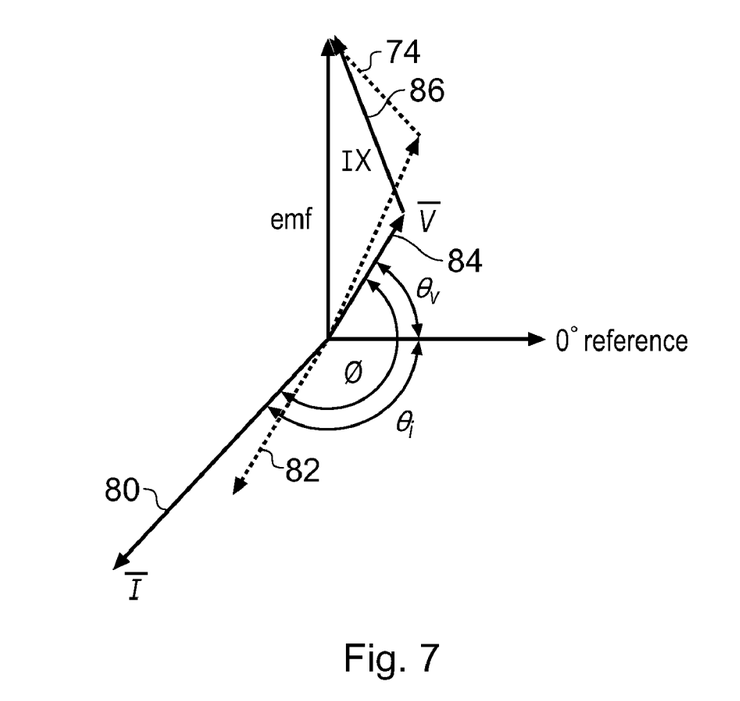
FIG. 7 is a phasor diagram showing the result of making a change to the vector shown in FIG. 6.

For most operating regions of the generator, this action results in a greater magnitude current $I_m$. Thus the magnitude of the current increases following the demand increase and reduces the current error. Ultimately a new steady state condition is reached. Similarly, when the current demand is reduced then the voltage magnitude increases. This action can be seen with reference to the phasor diagrams shown in FIGS. 6 and 7. In FIG. 6 the generator is in steady state operation with a fixed power angle $\phi$. The magnitude of the current output by the generator is dependent upon the difference between the voltage vector V, labelled 70 and the EMF vector 72 (which corresponds to the terminal voltage of the generator when no load is being drawn). Therefore it can be seen that the magnitude of the current is proportional to the difference between the vectors 70 and 72, as designated by the vector 74. FIG. 7 shows the new steady state after the current increase has been demanded. The new demand current is designated as 80 and can be seen to be of greater magnitude than the originally demanded current 82. The reduced voltage is now represented by vector 84 and, assuming that the generator speed has remained unchanged such that the EMF remains unaltered, then it can be seen that the difference between the voltage vector and the EMF vector as represented by line 86 has become increased, thereby producing more current. As a consequence, the current and voltage angles $\theta_I$ and $\theta_V$ have changed, but the power factor angle $\phi$ has remained constant.

Figure 8:
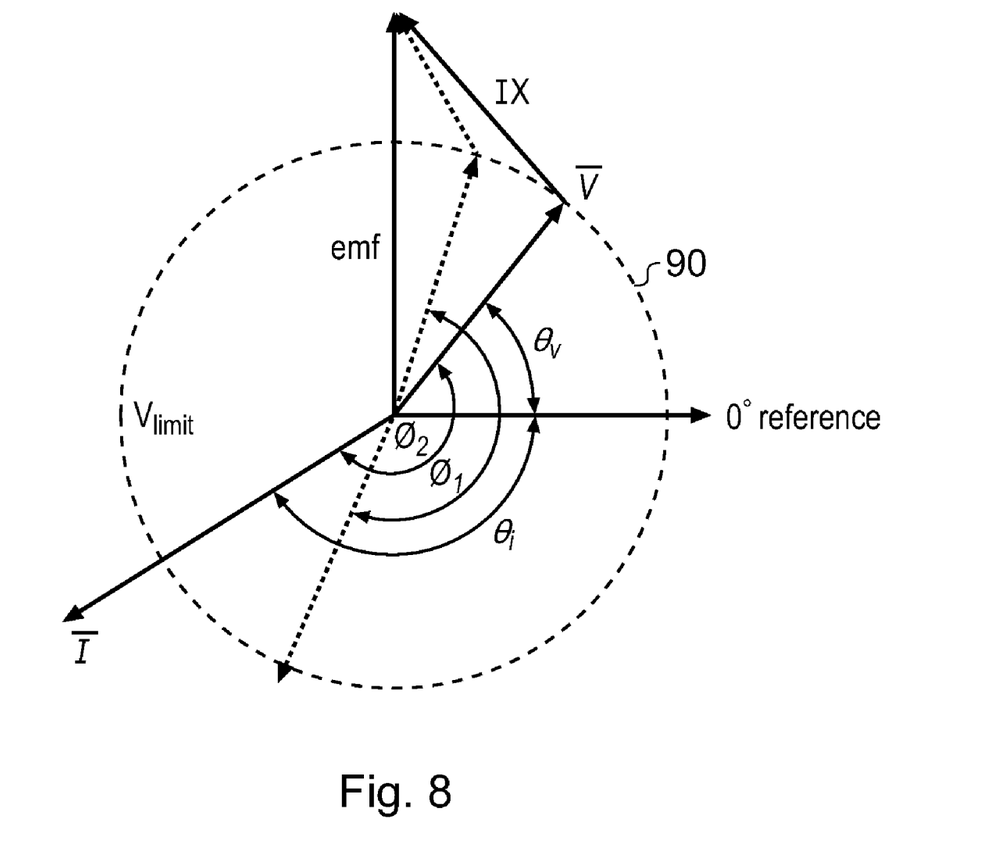
FIG. 8 is a further phasor diagram showing the control strategy once the voltage has become constrained by the DC link voltage at the output of the power converter.
Figure 9:
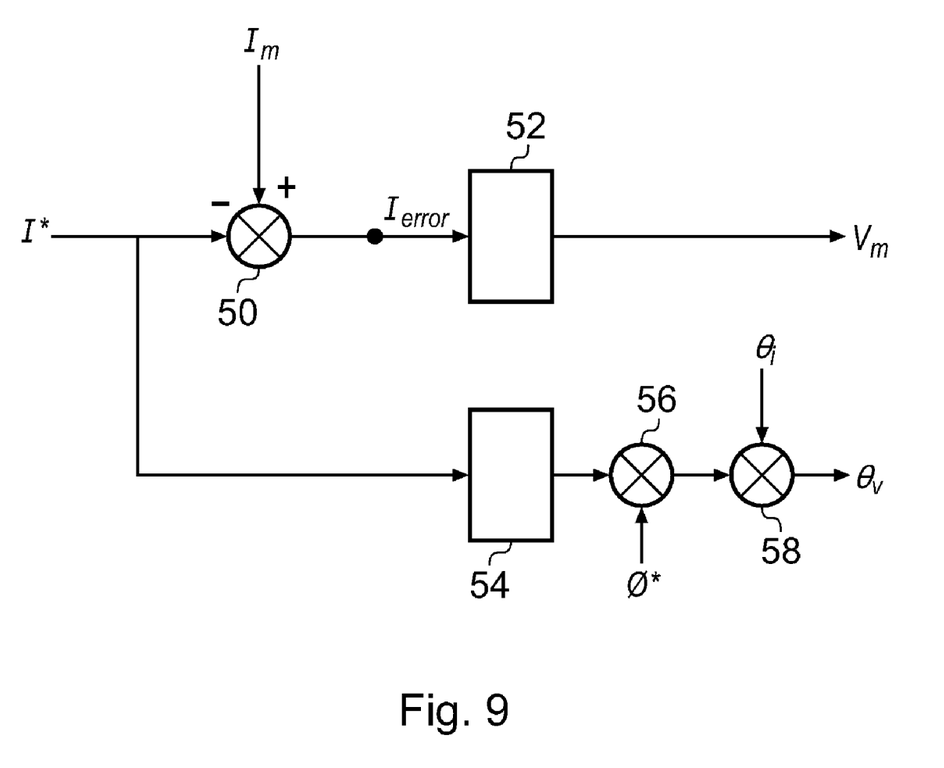
FIG. 9 schematically illustrates an alternative control strategy.

There is however a further possibility in that the voltage magnitude control of the voltage vector will reach an upper limit due to the finite available DC link voltage. This situation is shown in FIG. 8 where the chain line 90 represents the maximum magnitude of the voltage vector V. Once this limit is reached, no increase in the voltage is possible. However control of the current flowing from the generator is still available through altering the power factor angle $\phi$. Thus, a cross coupling compensation term is desirable. A controller suitable for operating under these conditions is shown in FIG. 9. The controller illustrated in FIG. 9 is similar to that shown in FIG. 5 and like reference numerals are used for like parts. It can be seen that the only difference is that the input to the controller 54 is now moved from the output of the summer 50 such that the controller 54 now receives the current demand value I* directly. The controller 54 simply implements a proportional term such that its output is directly proportional to the demand current I*. This allows the controller 52 to comprise a term that is proportional to the current error and a term that is the integral of the current error, both summed to produce the target voltage magnitude $V_m$. This provides a zero steady-state current error while still providing phase angle compensation for the effects of DC link saturation by employing the cross coupling block 54. In most cases, however, a steady state error is acceptable and the embodiment shown in FIG. 5 can be used as a preferred implementation.

It is thus possible to provide a generator controller for a permanent magnet generator which does not require any rotor position or voltage measurement of the generator.

The invention claimed is:

1. A method of controlling a permanent magnet generator where each phase of the generator is connectable to a DC link via electrically controllable switches, the method comprising the steps of:
   i) receiving a measurement of generator current output and a demand current, and forming a current error between the demand current and the measured generator current;
   ii) forming a target voltage phase angle as a function of a demanded power factor angle and a calculated current phase shift relative to a frame of reference and
   iii) forming control signals for controlling the electrically controllable switches as a function of the target voltage and the voltage phase angle.

2. A method as claimed in claim 1, in which the generator is a three phase generator and that measurements of the current are converted into a current vector having a magnitude and a phase with respect to a frame reference.

3. A method as claimed in claim 2, in which the frame of reference acts as a common frame of reference for the current vector and a voltage vector.

4. A method as claimed in claim 2, in which the frame of reference is an arbitrary frame of reference.

5. A method as claimed in claim 1, in which a Clark's transform is used to convert measured generator currents from a phase-time based space into a further measurement space.

6. A method as claimed in claim 5, in which a further transform is used to convert the values in the further measurement space to polar values such that the generator output current is represented by a magnitude and a phase angle.

7. A method as claimed in claim 1, in which the current error is multiplied by a coefficient to produce a target voltage magnitude.

8. A method as claimed in claim 1, in which one of the demanded current and the current error is used in the calculation of the voltage phase angle.

9. A method as claimed in claim 8, in which one of the demanded current and the current error is used to calculate a compensating phase angle, which is combined with a demanded power factor angle and a current phase angle to produce the voltage phase angle.

10. A method as claimed in claim 9, in which the current error is multiplied by a co-efficient to produce a target voltage magnitude, and that the target voltage magnitude and the voltage phase angle are transformed into phase voltages.

11. A method as claimed in claim 10, in which the target voltage magnitude and voltage phase angle are operated on using an inverse Clark's transform.

12. A method as claimed in claim 10, in which the target voltage is proportional to or partially proportional to the generator output current less the demanded current.

13. A computer program for causing a programmable data processor to execute the method of claim 1.

* * * * *

UNITED STATES PATENT AND TRADEMARK OFFICE
CERTIFICATE OF CORRECTION

PATENT NO. : 7,482,787 B2 Page 1 of 1
APPLICATION NO. : 11/746187
DATED : January 27, 2009
INVENTOR(S) : Philip Henry Mellor

It is certified that error appears in the above-identified patent and that said Letters Patent is hereby corrected as shown below:

In column 1 lines 4-5, above "FIELD OF THE INVENTION", it should read

--BACKGROUND OF THE INVENTION
This application is a divisional application of United States Serial No. 11/435,248, filed on May 16, 2006.--

Signed and Sealed this

Second Day of June, 2009

JOHN DOLL
*Acting Director of the United States Patent and Trademark Office*